(12) United States Patent
Oh et al.

(10) Patent No.: US 11,506,936 B2
(45) Date of Patent: *Nov. 22, 2022

(54) DISPLAY DEVICE FOR ENHANCING BACKLIGHT

(71) Applicant: LG ELECTRONICS INC., Seoul (KR)

(72) Inventors: Jaebok Oh, Seoul (KR); Seongmo Yang, Seoul (KR); Subin Kim, Seoul (KR); Yongil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,762

(22) Filed: Oct. 6, 2021

(65) Prior Publication Data

US 2022/0026767 A1 Jan. 27, 2022

Related U.S. Application Data

(63) Continuation of application No. 17/078,029, filed on Oct. 22, 2020, now Pat. No. 11,169,414.

(30) Foreign Application Priority Data

Oct. 25, 2019 (WO) ................ PCT/KR2019/014137

(51) Int. Cl.
*G02F 1/13357* (2006.01)

(52) U.S. Cl.
CPC .. *G02F 1/133608* (2013.01); *G02F 1/133603* (2013.01); *G02F 1/133605* (2013.01); *G02F 1/133606* (2013.01)

(58) Field of Classification Search
CPC ......... G02F 1/133608; G02F 1/133606; G02F 1/133603
See application file for complete search history.

(56) References Cited

U.S. PATENT DOCUMENTS

| 11,169,414 B2 * | 11/2021 | Oh .................... G02F 1/133603 |
| 2018/0239195 A1 | 8/2018 | Kumamoto et al. |
| 2021/0124218 A1 | 4/2021 | Oh et al. |

OTHER PUBLICATIONS

United States Patent and Trademark Office U.S. Appl. No. 17/078,029, Office Action dated Mar. 22, 2021, 8 pages.

* cited by examiner

*Primary Examiner* — Karabi Guharay
(74) *Attorney, Agent, or Firm* — Lee, Hong, Degerman, Kang & Waimey PC

(57) ABSTRACT

A display device is disclosed. The display device includes a display panel, a frame located at the rear of the display panel, a light source configured to provide light to the display panel, an optical layer configured to transmit the light provided by the light source, and a support located between the frame and the optical layer, the support being mounted at the frame, the support being configured to support the optical layer, wherein the support includes a base extending long, the base being placed on the frame, a bridge extending from one end to the other end of the base, the bridge being spaced apart from the base, a tower extending from the bridge toward the optical layer, a shaft extending from the lower surface of the base toward the frame, and a bar extending from the shaft in a direction intersecting the longitudinal direction of the base.

16 Claims, 14 Drawing Sheets

DISPLAY DEVICE FOR ENHANCING BACKLIGHT

CROSS-REFERENCE TO RELATED APPLICATION

This application is a continuation of U.S. patent application Ser. No. 17/078,029, filed on Oct. 22, 2020, which claims the benefit of earlier filing date and right of priority to International Application No. PCT/KR2019/014137, filed on Oct. 25, 2019, the contents of which are all hereby incorporated by reference herein in their entireties.

BACKGROUND OF THE INVENTION

1. Field of the Invention

The present disclosure relates to a display device.

2. Description of the Related Art

As the information society has developed, the demand for display devices is increasing in various forms, and accordingly, in recent years, various display devices such as a liquid crystal display (LCD), electroluminescent display (ELD), vacuum fluorescent display (VFD), organic light emitting diode (OLED), and the like have been studied and used.

Thereamong, a liquid crystal panel of the LCD includes a liquid crystal layer and a TFT substrate and a color filter substrate opposite each other while the liquid crystal layer is interposed therebetween, and may display an image using light provided by a backlight unit.

In recent years, much research has been actively conducted on a backlight unit that provides high-luminance light to a display panel with an increase in quality of an image provided by a display device.

SUMMARY OF THE INVENTION

It is an object of the present disclosure to solve the above and other problems.

It is another object of the present disclosure to provide a display device configured such that light efficiency of a backlight unit is improved.

It is another object of the present disclosure to provide a display device having improved image quality.

It is another object of the present disclosure to provide a display device configured such that spatial efficiency of a backlight unit is improved.

It is a further object of the present disclosure to provide a display device having improved productivity.

In accordance with an aspect of the present disclosure, the above and other objects can be accomplished by the provision of a display device including a display panel, a frame located at the rear of the display panel, a light source located between the display panel and the frame, the light source being configured to provide light to the display panel, an optical layer located between the display panel and the light source, the optical layer being configured to transmit the light provided by the light source, and a support located between the frame and the optical layer, the support being mounted at the frame, the support being configured to support the optical layer, wherein the support includes a base extending long, the base being placed on the frame, a bridge extending from one end to the other end of the base, the bridge being spaced apart from the base at the upper side of the base, a tower extending from the bridge toward the optical layer, a shaft extending from the lower surface of the base toward the frame, and a bar extending long from the shaft in a direction intersecting the longitudinal direction of the base.

In accordance with another aspect of the present disclosure, the frame may include a flat portion and an inclined portion extending from the flat portion toward the display panel in the state of being inclined, and the flat portion may include a fixing recess portion recessed from the rear surface of the flat portion toward the front surface of the flat portion and a bar slot formed in the fixing recess portion, the bar slot being cut out such that the bar of the support passes through the bar slot, the bar slot intersecting the longitudinal direction of the base and the longitudinal direction of the bar.

In accordance with another aspect of the present disclosure, the intersection angle formed by the base and the bar may be about 21 degrees.

In accordance with another aspect of the present disclosure, the intersection angle formed by the base and the bar slot may be about 14 degrees.

In accordance with another aspect of the present disclosure, the intersection angle formed by the bar and the bar slot may be about 35 degrees.

In accordance with another aspect of the present disclosure, the support may further include a stopper formed at the outer circumferential surface of the shaft, the stopper being located between the base and the bar, and the frame may further include a stopper slot formed in the fixing recess portion, the stopper slot extending long in a direction intersecting the bar slot, the stopper slot being shorter than the length of the bar slot, the stopper slot corresponding to the stopper.

In accordance with another aspect of the present disclosure, the intersection angle formed by the stopper slot and the bar slot may be about 35 degrees.

In accordance with another aspect of the present disclosure, the support may be placed in the fixing recess portion, and, when the bar of the support is inserted into the bar slot and is then rotated, the stopper of the support may contact the stopper slot.

In accordance with another aspect of the present disclosure, the frame may include a first protrusion hole formed so as to be spaced apart from one end of the stopper slot in the longitudinal direction of the stopper slot and a second protrusion hole formed so as to be spaced apart from the other end of the stopper slot in the longitudinal direction of the stopper slot, and the support may include a first protrusion located adjacent to one end of the bar, the first protrusion protruding from the bar toward the base so as to be inserted into the first protrusion hole, and a second protrusion located adjacent to the other end of the bar, the second protrusion protruding from the bar toward the base so as to be inserted into the second protrusion hole.

In accordance with another aspect of the present disclosure, the support may further include a bottom configured to form a step at the lower surface of the base together with the lower surface of the base, and the bottom may be supported at the front surface of the flat portion by the fixing recess portion.

In accordance with a further aspect of the present disclosure, the display device may further include a reflection sheet located on the frame, the reflection sheet being configured to reflect the light provided by the light source toward the display panel, wherein a portion of the reflection sheet may be inserted into a gap formed between the front surface of the frame and the lower surface of the base by the bottom, and the base of the support may push the upper surface of the reflection sheet.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
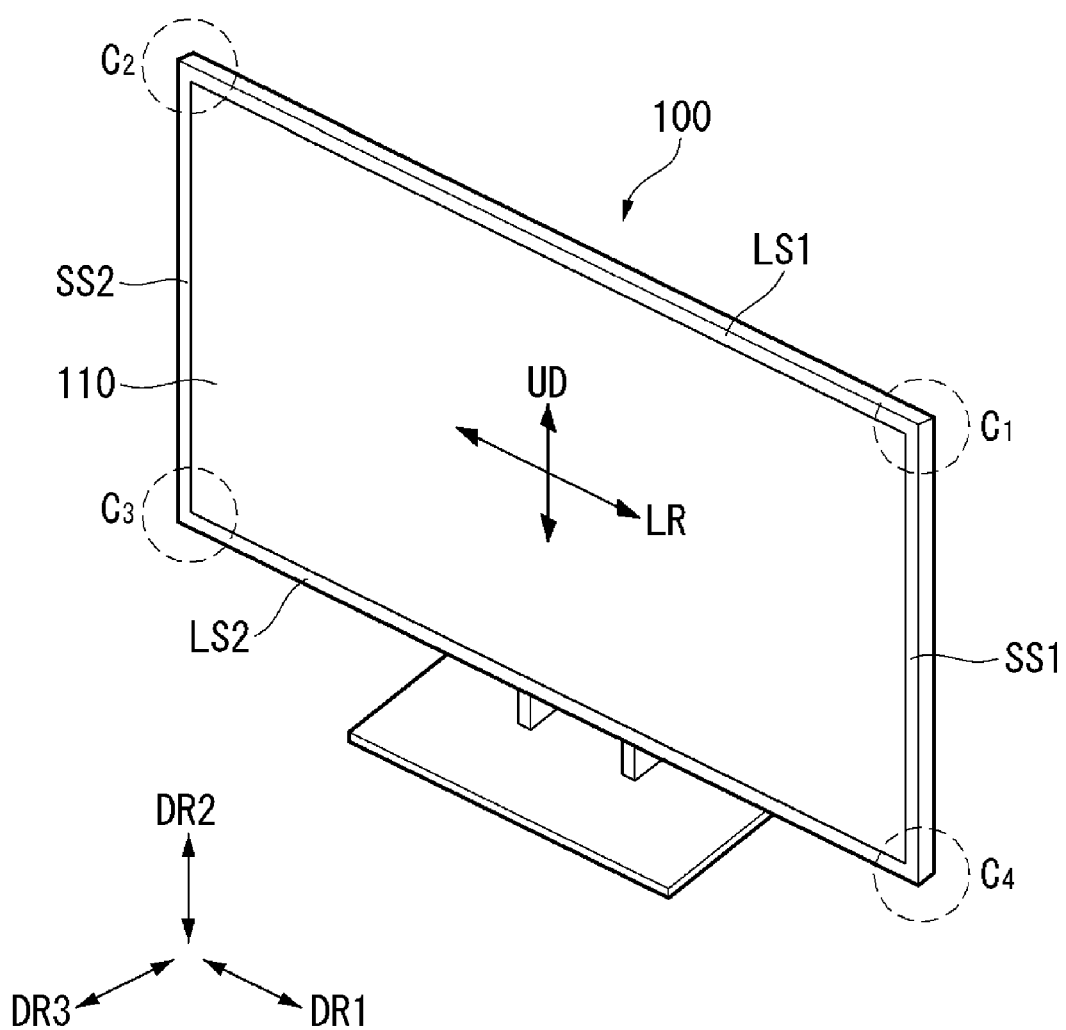
FIGS. 1 to 6 are views showing examples of a display device related to the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, a liquid crystal display (LCD) panel will be described by way of example as a display panel; however, a display panel applicable to the present disclosure is not limited to the LCD panel, and a field emission display (FED) panel or an organic light emitting diode (OLED) panel may also be used.

Also, in the following description, a display device 100 may include a first long side LS1, a second long side LS2 opposite the first long side LS1, a first short side SS1 adjacent to the first long side LS1 and the second long side LS2, and a second short side SS2 opposite the first short side SS1.

Here, the first short side area SS1 may be referred to as a first side area, the second short side area SS2 may be referred to as a second side area, the first long side area LS1 may be referred to as a third side area adjacent to the first side area and the second side area and located between the first side area and the second side area, and the second long side area LS2 may be referred to as a fourth side area adjacent to the first side area and the second side area, located between the first side area and the second side area, and opposite the third side area.

In addition, although the length of the first and second long sides LS1 and LS2 is shown and described as being greater than the length of the first and second short sides SS1 and SS2 for convenience of description, the length of the first and second long sides LS1 and LS2 may be approximately equal to the length of the first and second short sides SS1 and SS2.

Also, in the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

The side of the display device 100 at which an image is displayed may be referred to as a front or a front surface. The side of the display device 100 at which an image is not observed when the display device 100 displays the image may be referred to as a rear or a rear surface. When the display device 100 is seen from the front or the front surface, the first long side portion LS1 may be referred to as an upper side or an upper surface, and the second long side portion LS2 may be referred to as a lower side or a lower surface. The first short side portion SS1 may be referred to as a right side or a right surface, and the second short side portion SS2 may be referred to as a left side or a left surface.

The first long side LS1, the second long side LS2, the first short side SS1, and the second short side SS2 may be referred to as edges of the display device 100. In addition, the points at which the first long side LS1, the second long side LS2, the first short side SS1, and the second short side SS2 join may be referred to as corners. For example, the point at which the first long side LS1 and the first short side SS1 join may be referred to as a first corner C1, the point at which the first long side LS1 and the second short side SS2 join may be referred to as a second corner C2, the point at which the second short side SS2 and the second long side LS2 join may be referred to as a third corner C3, and the point at which the second long side LS2 and the first short side SS1 join may be referred to as a first corner C4.

Here, a direction from the first short side SS1 to the second short side SS2 or a direction from the second short side SS2 to the first short side SS1 may be referred to as a leftward-rightward direction LR. A direction from the first long side LS1 to the second long side LS2 or a direction from the second long side LS2 to the first long side LS1 may be referred to as an upward-downward direction UD.

Figure 2:
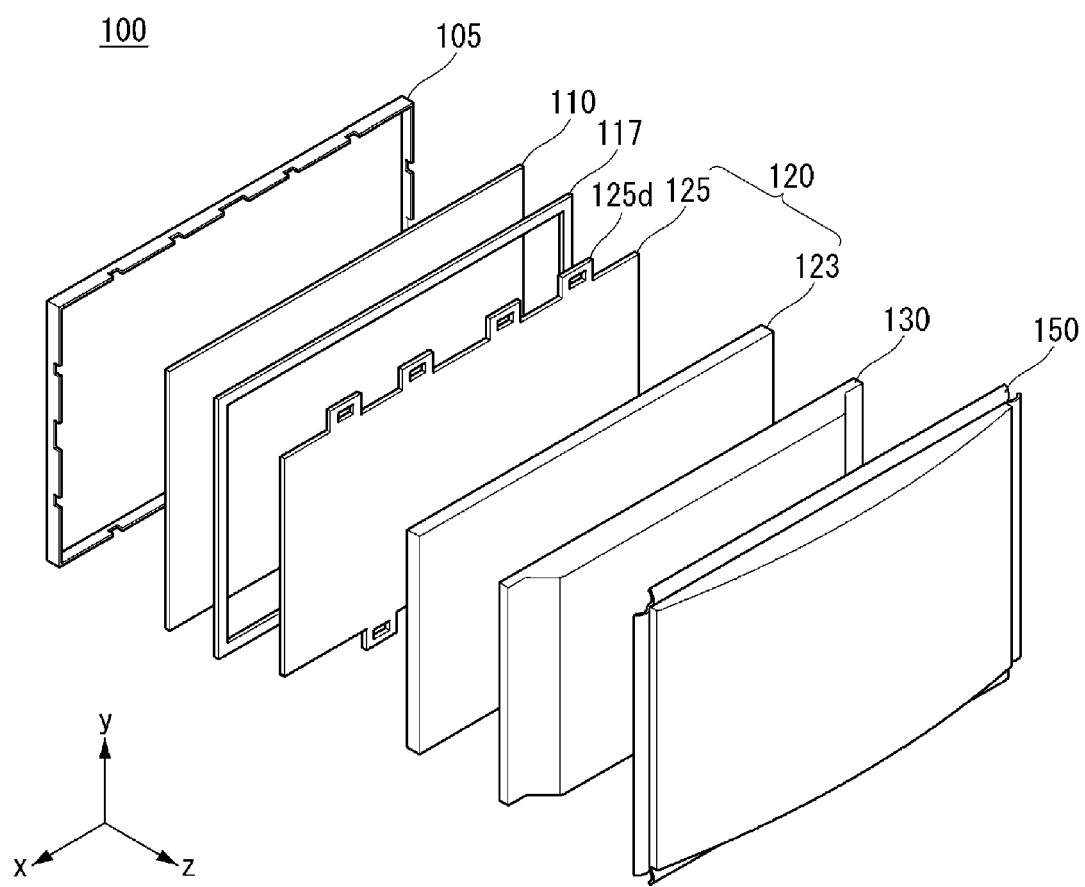

Referring to FIGS. 1 and 2, a display panel 110 may located at the front of the display device 100, and may display an image. The display panel 110 may have a plurality of pixels, and may set hue, brightness, and saturation per pixel to output an image.

The display panel 110 may be divided into an active area in which an image is displayed and an inactive area in which no image is displayed. The display panel 110 may include a front substrate and a rear substrate opposite each other in the state in which a liquid crystal layer is interposed therebetween.

The front substrate may include a plurality of pixels, each of which consists of red (R), green (G), and blue (B) subpixels. The front substrate may generate a color corresponding to red, green, or blue according to a control signal.

The rear substrate may include switching elements. The rear substrate may switch a pixel electrode. For example, the pixel electrode may change the arrangement of molecules of the liquid crystal layer according to a control signal applied from the outside. The liquid crystal layer may include a plurality of liquid crystal molecules. The arrangement of the liquid crystal molecules may be changed in response to a voltage difference generated between the pixel electrode and a common electrode. The liquid crystal layer may transmit light provided by a backlight unit 120 to the front substrate.

A front cover 105 may cover at least a portion of the front surface and the side surface of the display panel 110. The front cover 105 may have a hollow quadrangular frame shape.

The front cover 105 may be divided into a front cover and a side cover. That is, the front cover 105 may be divided into a front cover located at the front surface of the display panel 110 and a side cover located at the side surface of the display panel 110. The front cover and the side cover may be separately configured. One of the front cover and the side cover may be omitted. For example, only the side cover may be provided without the front cover for beautiful design, etc.

A guide panel 117 may be located at the rear of the display panel 110. The guide panel 117 may support a portion of the rear surface of the display panel 110. The guide panel 117 may contact the contour of the display panel 110. The guide panel 117 may be coupled to a frame 130.

The backlight unit 120 may be located at the rear of the display panel 110. The backlight unit 120 may include a plurality of light sources. The backlight unit 120 may be a direct type backlight unit or an edge type backlight unit. The edge type backlight unit 120 may further include a light guide portion or a light guide panel (LGP).

The backlight unit 120 may be located at the front surface of the frame 130. For example, the plurality of light sources may be disposed at the front surface of the frame 130. In this case, the backlight unit 120 may be a direct type backlight unit.

The backlight unit 120 may be driven in an entire driving mode or a partial driving mode, such as a local dimming mode or an impulsive mode. The backlight unit 120 may include an optical sheet 125 and an optical layer 123.

The optical sheet 125 may disperse light of the light sources. The optical sheet 125 may consist of a plurality of layers. For example, the optical sheet 125 may include at least one prism sheet and/or at least one diffusion sheet.

The optical sheet 125 may have at least one coupling portion 125d. The coupling portion 125d may be coupled to the front cover 105, the frame 130, and/or a back cover 150. That is, the coupling portion 125d may be directly coupled to the front cover 105, the frame 130, and/or the back cover 150. Alternatively, the coupling portion 125d may be coupled to a structure coupled to the front cover 105, the frame 130, and/or the back cover 150. That is, the coupling portion 125d may be indirectly coupled to the front cover 105, the frame 130, and/or the back cover 150.

The optical layer 123 may include a light source. The optical layer 123 will be described in detail later.

The frame 130 may support components of the display device 100. For example, the backlight unit 120 may be coupled to the frame 130. The frame 130 may be made of a metal material, such as an aluminum alloy.

The back cover 140 may be located at the rear of the display device 100. The back cover 140 may protect internal components from the outside. At least a portion of the back cover 150 may be coupled to the frame 130 and/or the front cover 105. The back cover 150 may be made of an injection-molded resin material.

Figure 3:
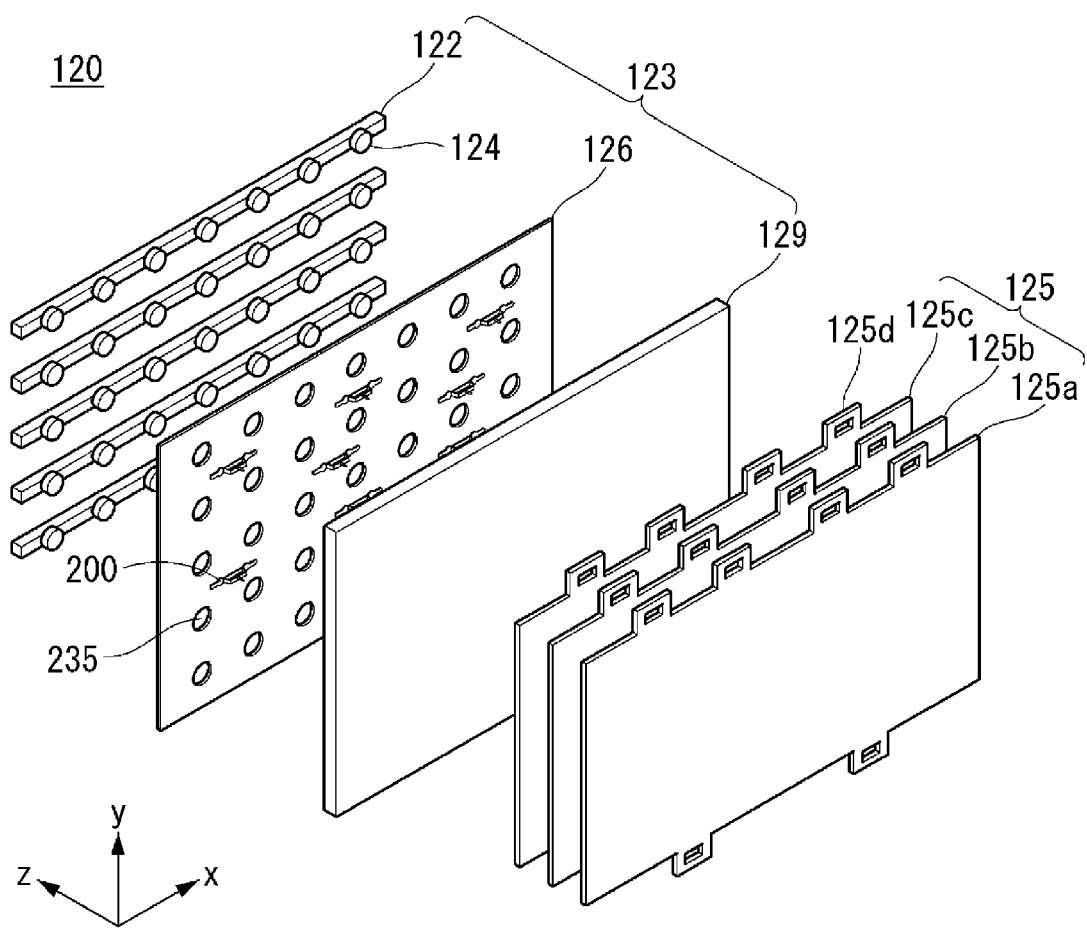

Referring to FIG. 3, the backlight unit 120 may include an optical layer 123 including a substrate 122, at least one light assembly 124, a reflection sheet 126, and a diffusion plate 129, and an optical sheet 125 located in front of the optical layer 123. However, the components of the backlight unit 120 are not limited thereto, and one or more of the components thereof may be omitted.

The substrate 122 may be configured in the shape of a plurality of straps extending in a first direction and spaced apart from each other by a predetermined distance in a second direction, which is perpendicular to the first direction.

The at least one light assembly 124 may be mounted on the substrate 122. An electrode pattern for connecting an adaptor and the light assembly 124 may be formed on the substrate 122. For example, a carbon nanotube (CNT) pattern may be formed as the electrode pattern.

The substrate 122 may be made of at least one of polyethylene terephthalate (PET), glass, polycarbonate (PC), or silicon. The substrate 122 may be a printed circuit board (PCB).

The light assemblies 124 may be disposed on the substrate 122 at predetermined intervals in the first direction. The diameter of each light assembly 124 may be greater than the width of the substrate 122. That is, the diameter of the light assembly 124 may be greater than the length of the substrate 122 in the second direction.

The light assembly 124 may be a light emitting diode (LED) chip or a light emitting diode package including at least one light emitting diode chip.

The light assembly 124 may consist of a colored LED that emits at least one of red, blue, or green, or a white LED. The colored LED may include at least one of a red LED, a blue LED, or a green LED.

The light source included in the light assembly 124 may be a chip on board (COB) type light source. The COB type light source may have a form in which an LED chip, as a light source, is directly coupled to the substrate 122. In this case, the manufacturing process may be simplified. In addition, resistance may be reduced, and therefore heat loss energy may be reduced. That is, power efficiency of the light assembly 124 may be improved. The COB type light source may provide brighter illumination. The COB type light source may have a thickness and weight less than those of a conventional light source.

The reflection sheet 126 may be located at the front surface of the substrate 122. The reflection sheet 126 may have through-holes 235 into which the light assemblies may be inserted.

The reflection sheet 126 may reflect light provided by the light assemblies 124 to the front. In addition, the reflection sheet 126 may reflect light reflected by the diffusion plate 129 toward the diffusion plate 129 again.

The reflection sheet 126 may include at least one of a metal or a metal oxide as a reflective material. For example, the reflection sheet 126 may include a metal or metal oxide that exhibits high reflectance, such as at least one of aluminum (Al), silver (Ag), gold (Au), or titanium dioxide ($TiO_2$).

The reflection sheet 126 may be formed by depositing or coating a metal or a metal oxide on the substrate 122. Ink including a metal material may be printed on the reflection sheet 126. A deposition layer may be formed on the reflection sheet 126 using a vacuum deposition method, such as a thermal deposition method, an evaporation method, or a sputtering method. A coating layer and/or a printing layer may be formed on the reflection sheet 126 using a printing method, a gravure coating method, or a silk screen method.

An air gap may be located between the reflection sheet 126 and the diffusion plate 129. The air gap may widely spread light emitted by the light assemblies 124. In order to maintain the air gap, a support 200 may be located between the reflection sheet 126 and the diffusion plate 129. The air gap may be referred to as an optical gap.

A resin may be deposited on the light assemblies 124 and/or the reflection sheet 126. The resin may diffuse light emitted by the light assemblies 124. The diffusion plate 129 may diffuse light emitted by the light assemblies 124 upwards.

The optical sheet 125 may be located in front of the diffusion plate 129. The rear surface of the optical sheet 125 may face the diffusion plate 129, and the front surface of the optical sheet 125 may face the rear surface of the display panel 110.

The optical sheet 125 may include at least one sheet. Specifically, the optical sheet 125 may include at least one prism sheet and/or at least one diffusion sheet. The plurality of sheets included in the optical sheet 125 may be in an adhered and/or tight contact state.

The optical sheet 125 may consist of a plurality of sheets having different functions. For example, the optical sheet 125 may include first to third optical sheets 125*a* to 125*c*. The first optical sheet 125*a* may have the function of a diffusion sheet, and each of the second and third optical sheets 125*b* and 125*c* may have the function of a prism sheet. The number and/or positions of the diffusion sheets and the prism sheets may be changed.

The diffusion sheet may prevent partial concentration of light emitted from the diffusion plate such that the light is more uniformly distributed. The prism sheet may condense light emitted from the diffusion plate such that the light is incident perpendicularly on the display panel 110.

The coupling portions 125*d* may be formed at one side or at least one edge of the optical sheet 125. The coupling portions 125*d* may be formed at at least one of the first to third optical sheets 125*a* to 125*c*.

The coupling portions 125*d* may be formed at the long side or the edge of the optical sheet 125. The coupling portions 125*d* formed at the first long side and the coupling portions 125*d* formed at the second long side may be asymmetric. For example, the position and/or number of the coupling portions 125*d* formed at the first long side may be different from the position and/or number of the coupling portions 125*d* formed at the second long side.

Figure 4:
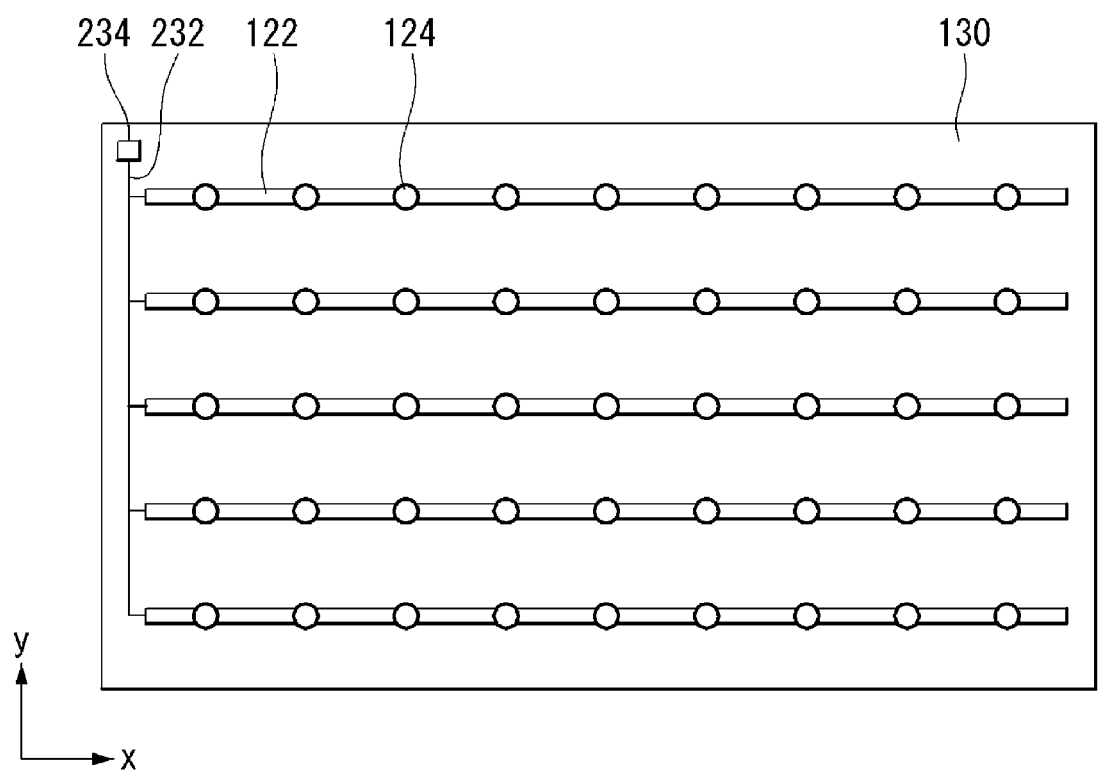

Referring to FIG. 4, a substrate 122 consisting of a plurality of straps extending in the first direction and spaced apart from each other by a predetermined distance in the second direction, which is perpendicular to the first direction, may be provided on the frame 130. One side of each of the plurality of substrates 122 may be connected to a wiring electrode 232.

The wiring electrode 232 may extend in the second direction. The wiring electrode 232 may be connected to one side of the substrate 122 in the state of being spaced apart therefrom in the second direction.

A wiring hole 234 may be formed in one side of the wiring electrode 232. The wiring hole 234 may be a micro-hole formed through the frame 130. The wiring electrode 232 may extend to the rear surface of the frame 130 through the wiring hole 234. The wiring electrode 232 may be electrically connected to an adaptor (not shown) located at the rear surface of the frame 130 through the wiring hole 234.

The light assemblies 124 may be disposed on the substrate 122 at predetermined intervals in the first direction. The diameter of each light assembly 124 may be greater than the width of the substrate 122 in the second direction.

Figure 5:
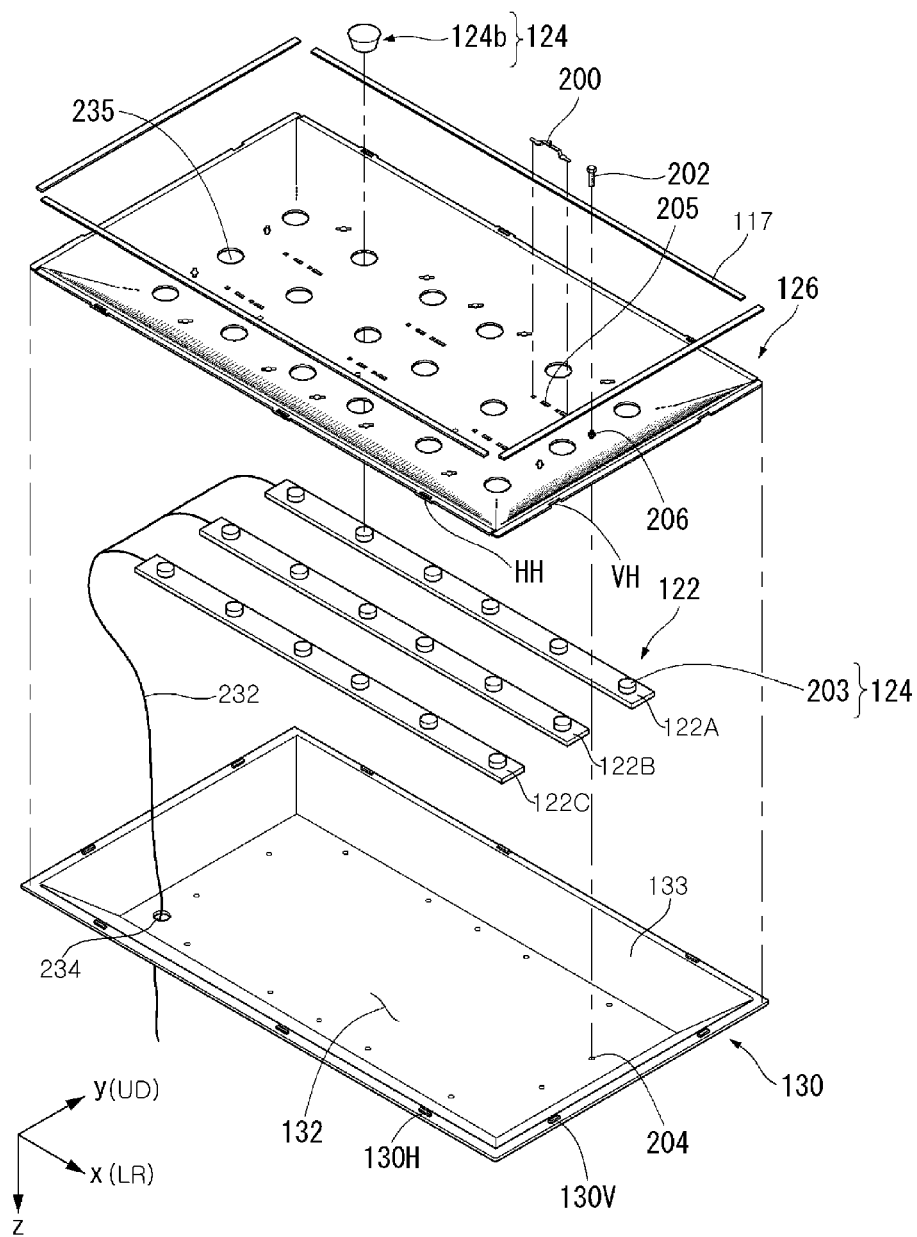

Referring to FIG. 5, the frame 130 may include a flat portion 132 and an inclined portion 133. The flat portion 132 may be planar. The inclined portion 133 may extend forwards from the flat portion 132 while having a predetermined inclination relative to the flat portion 132. The frame 130 may generally have the shape of a tub. The reflection sheet 126 may generally have the shape of a tub so as to correspond to the shape of the frame 130. A space may be formed between the inclined portion 133 and the reflection sheet 126.

The substrate 122 may be mounted or disposed on the flat portion 132. A plurality of substrates 122 may be sequentially disposed. The plurality of substrates 122 may be spaced apart from each other. For example, a first frame 122A may extend long in the leftward-rightward direction LR of the frame 130, and may be disposed in the longitudinal direction of the frame 130. A second frame 122B may extend long in the leftward-rightward direction LR of the frame 130, and may be mounted on the frame 130 in the state of being spaced apart from the first frame 122A. A third frame 122C may extend long in the leftward-rightward direction LR of the frame 130, and may be mounted on the frame 130 in the state of being spaced apart from the second frame 122B.

The distance between the substrates 122 may be changed depending on the number of pixels of the display panel 110 (see FIG. 2). For example, the distance between the substrates 122 necessary to provide light to a display panel 111 that realizes 8K quality may be less than the distance between the substrates 122 necessary to provide light to a display panel 111 that realizes 4K quality. In the case in which the number of pixels of the display panel 110 is increased or image quality that can be realized by the display panel 110 is increased, the light transmission ratio of the display panel 110 may be reduced. To this end, a large number of substrates 122 may be disposed in order to increase the luminance of light provided by the backlight unit 120 (see FIG. 3).

The reflection sheet 126 may include a plurality of through-holes 235. The plurality of through-holes 235 may correspond in number to the plurality of light assemblies 124. The reflection sheet 126 may be placed on the frame 130 and/or the substrates 122. At this time, lenses 124*b* of the plurality of light assemblies 124 may be inserted into the plurality of through-holes 235 so as to protrude above the reflection sheet 126. The reflection sheet 126 may be coupled or fixed to the frame 130 via a fixing member 202. The support 200 may be mounted on the reflection sheet 126.

Coupling ribs 130H and 130V may be formed on the upper end of the inclined portion 133 of the frame 130, and the reflection sheet 126 may have coupling holes VH and HH, whereby the coupling ribs 130H and 130V may be inserted into the coupling holes VH and HH. Consequently, the reflection sheet 126 may be fixed to the frame 130.

The guide panel 117 may be located at the contour of the reflection sheet 126, and may be coupled to the frame 130. The guide panel 117 may support the display panel 110 (see FIG. 2). Guide panels 117 may be located at four sides of the reflection sheet 126.

Figure 6:
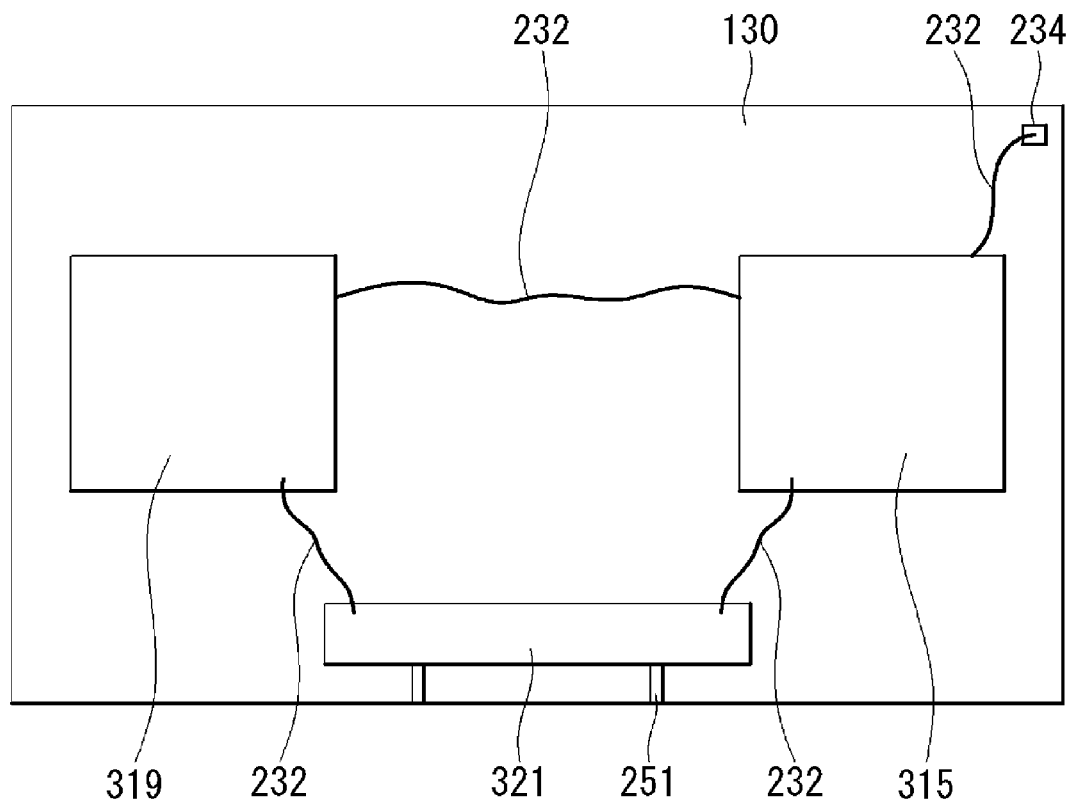

Referring to FIG. 6, the wiring electrode 232 extending from the front surface of the frame 130 through the wiring hole 234 may be electrically connected to a power supply 315. The power supply 315 may be a printed circuit board for supplying power to the display device 100. The power supply 315 may convert AC power into DC power.

The power supply 315 may supply current to the light assembly 124 through the wiring electrode 232. The power supply 315 may be electrically connected to a main board 321 via the wiring electrode 232. The main board 321 may be spaced apart from the power supply 315 by a predetermined distance.

The main board 321 may be a printed circuit board that provides an interface necessary to operate the display device 100. In addition, the main board 321 may inspect and maintain the operation state of each component of the display device 100.

The main board 321 and the power supply 315 may be electrically connected to a t-con board 319 via the wiring electrode 232. The t-con board 319 may be a printed circuit board for transmitting power or a signal input from the main board 321 or the power supply 315 to the display panel 110. The t-con board 319 may be electrically connected to the display panel 110 at the front surface of the frame 130 via a flexible flat cable (FFC) 251.

The printed circuit boards are shown as being connected to each other. However, the present disclosure is not limited thereto, and only some of the printed circuit boards may be connected to each other.

Figure 7:
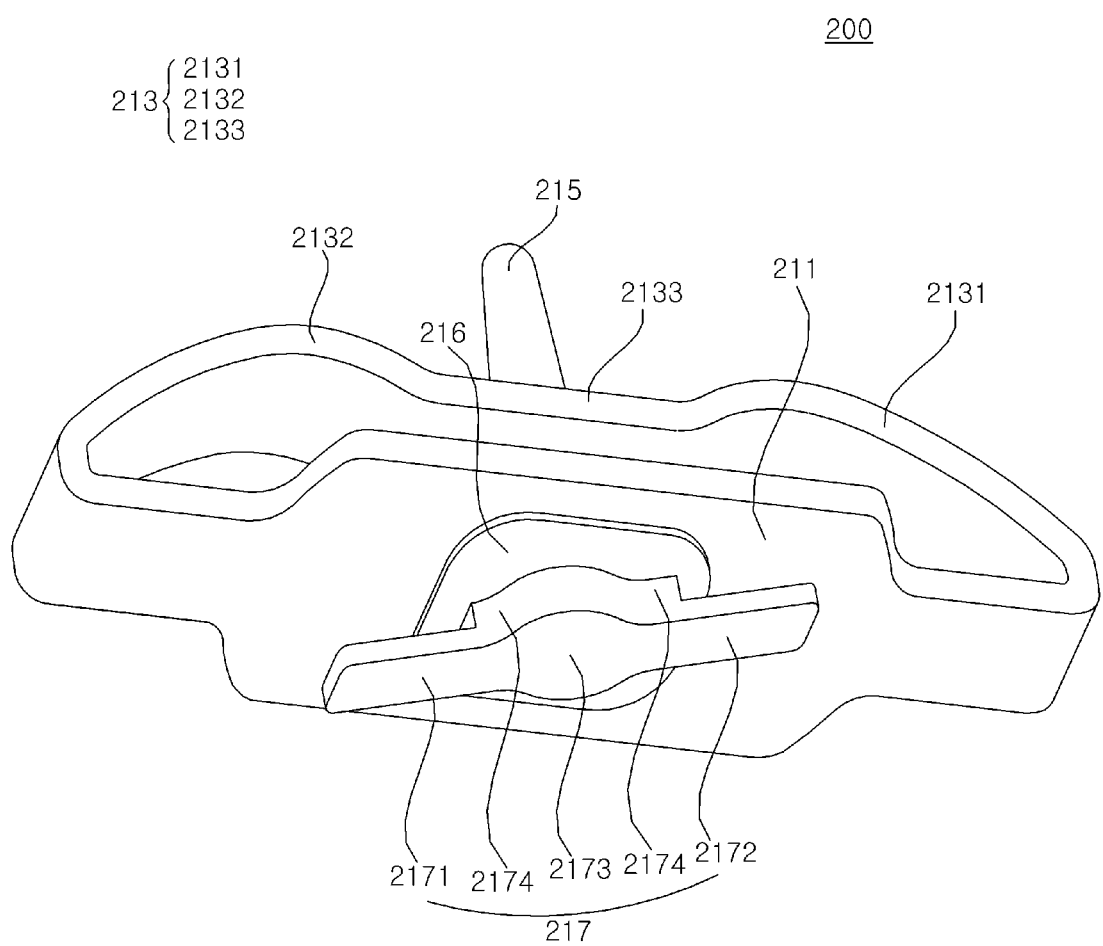
FIGS. 7 to 14 are views showing examples of a display device according to an embodiment of the present disclosure.

Referring to FIG. 7, the support 200 may include a base 211, a bridge 213, a tower 215, a bottom 216, and a fixing bar 217. The base 211 may be a plate extending long. The bridge 213 may be spaced apart from the base 211, may extend from one end to the other end of the base 211, and may connect the one end to the other end of the base 211.

The bridge 213 may include a first shoulder 2131, a second shoulder 2132, and a loop 2133. The first shoulder 2131 may extend to the upper side of the base 211 while forming an arch at one end of the base 211. The second shoulder 2132 may extend to the upper side of the base 211 while forming an arch at the other end of the base 211. The loop 2133 may connect the first shoulder 2131 and the second shoulder 2132 to each other.

The distance between the first shoulder 2131 and the base 211 and/or the distance between the second shoulder 2132 and the base 211 may be greater than the distance between the loop 2133 and the base 211. That is, the upper end surface of the first shoulder 2131 and/or the upper end surface of the second shoulder 2132 may protrude further forwards than the upper surface of the loop 2133. The first shoulder 2131, the second shoulder 2132, and/or the loop 2133 may be elastic.

The tower 215 may extend long from the upper surface of the loop 2133. The tower 215 may have a diameter that gradually decreases in the extension direction thereof. The tower 215 may have a cylindrical shape. For example, the tower 215 may be elastic so as to be easily bent, or may be rigid so as not to be bent.

The bottom 216 may form a step at the lower surface of the base 211. The step formed by the bottom 216 and the lower surface of the base 211 may correspond to the thickness of the reflection sheet 126.

The fixing bar 217 may have a shaft 2173, a stopper 2174, and bars 2171 and 2172. The bars 2171 and 2172 may extend while crossing the lower surface of the bottom 216, and may be spaced apart from the bottom 216. The shaft 2173 may extend so as to protrude from the lower surface of the bottom 216 toward the bars 2171 and 2172. The stopper 2174 may be formed so as to protrude from the outer circumferential surface of the shaft 2173. The stopper 2174 may be formed at opposite sides of the outer circumferential surface of the shaft 2173, or may be formed at one side thereof. A portion of a space formed by the bottom 216 and the bars 2171 and 2172 may be filled with the stopper 2174.

Figure 8:
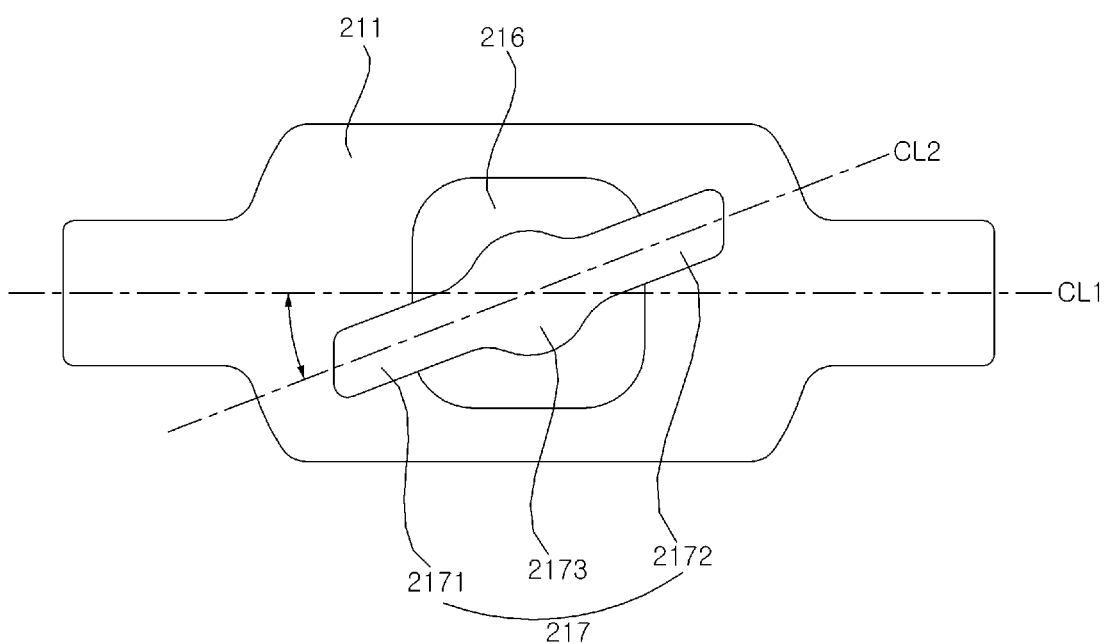
Figure 9:
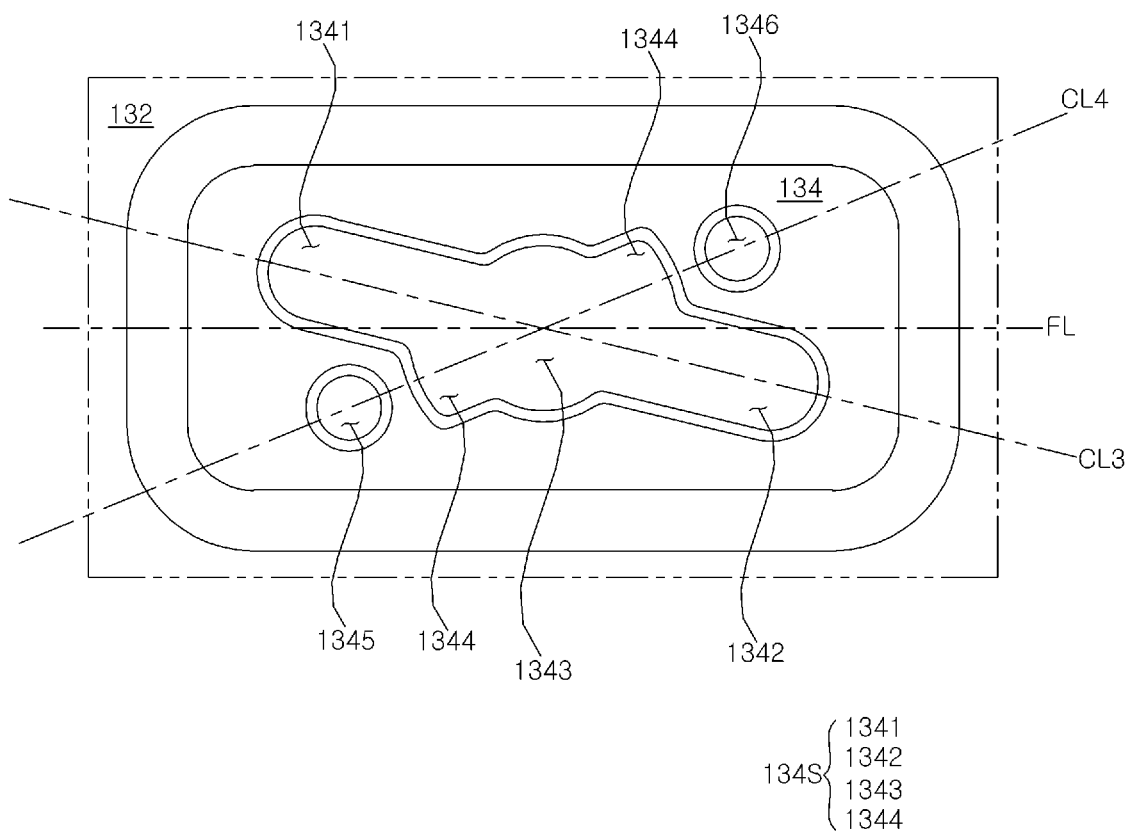

Referring to FIGS. 8 and 9, the base 211 may have a long axis CL1 in the longitudinal direction thereof. The bars 2171 and 2172 may have a long axis CL2 in the longitudinal direction thereof. The long axis CL2 of the bars may be tilted or form a predetermined angle relative to the long axis CL1 of the base 211. For example, the angle between the long axis CL2 of the bars and the long axis CL1 of the base 211 may be 21 degrees.

A fixing slot 134S may be formed in the flat portion 132 of the frame 130. The frame 130 may include a fixing recess portion 134. The fixing recess portion 134 may be formed as the result of the frame 130 being pressed and protruding to the front of the frame. The fixing recess portion 134 may generally have a rectangular shape. The fixing slot 134S may be formed by punching the fixing recess portion 134. The fixing slot 134S may include bar slots 1341 and 1342, a shaft hole 1343, and a stopper slot 1344. The fixing recess portion 134 may have a long axis FL of the frame 130 in the longitudinal direction thereof.

The bar slots 1341 and 1342 may have a shape corresponding to the shape of the bars 2171 and 2172, and may be tilted or form a predetermined angle relative to the long axis FL of the frame. For example, the angle between a long axis CL3 of the bar slots 1341 and 1342 and the long axis FL of the frame may be 14 degrees. The stopper slot 1344 may be tilted or form a predetermined angle relative to the long axis FL of the frame. The stopper slot 1344 may intersect the bar slots 1341 and 1342. For example, the angle between a long axis CL4 of the stopper slot 1344 and the long axis FL of the frame may be 21 degrees.

Protrusion holes 1345 and 1346 may be formed on the long axis CL4 of the stopper slot 1344. The first protrusion hole 1345 may be located so as to be spaced apart from one end of the stopper slot 1344, and the second protrusion hole 1346 may be located so as to be spaced apart from the other end of the stopper slot 1344. The protrusion holes 1345 and 1346 may be symmetrical with respect to the stopper slot 1344.

Figure 10:
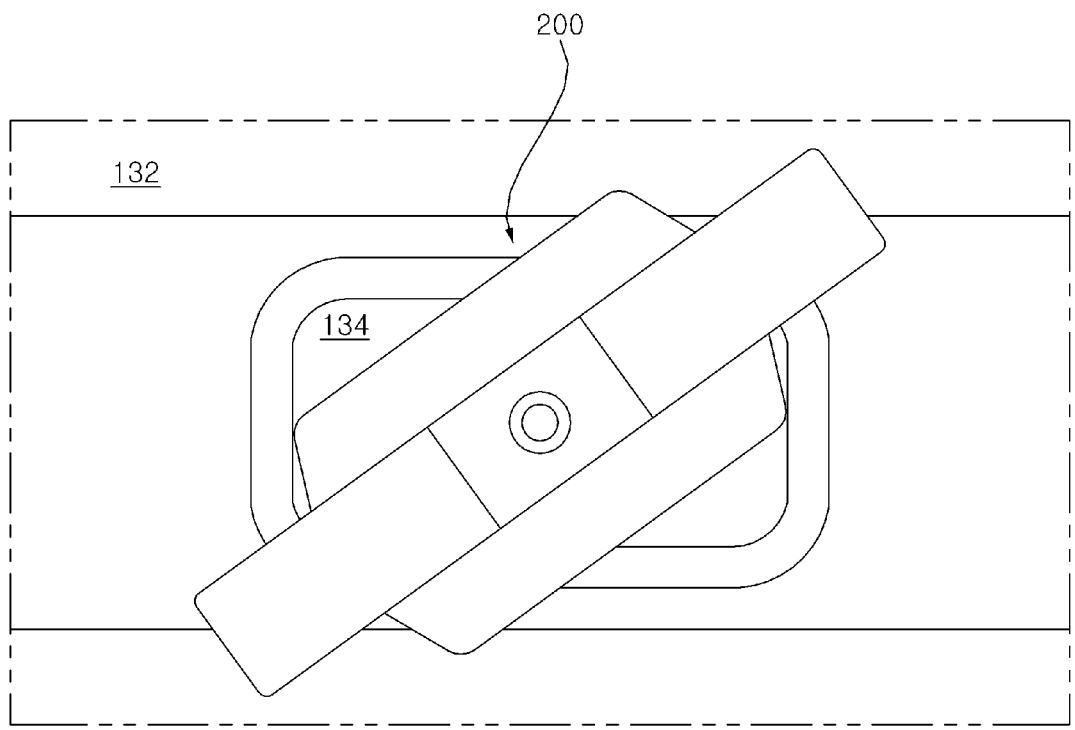
Figure 11:
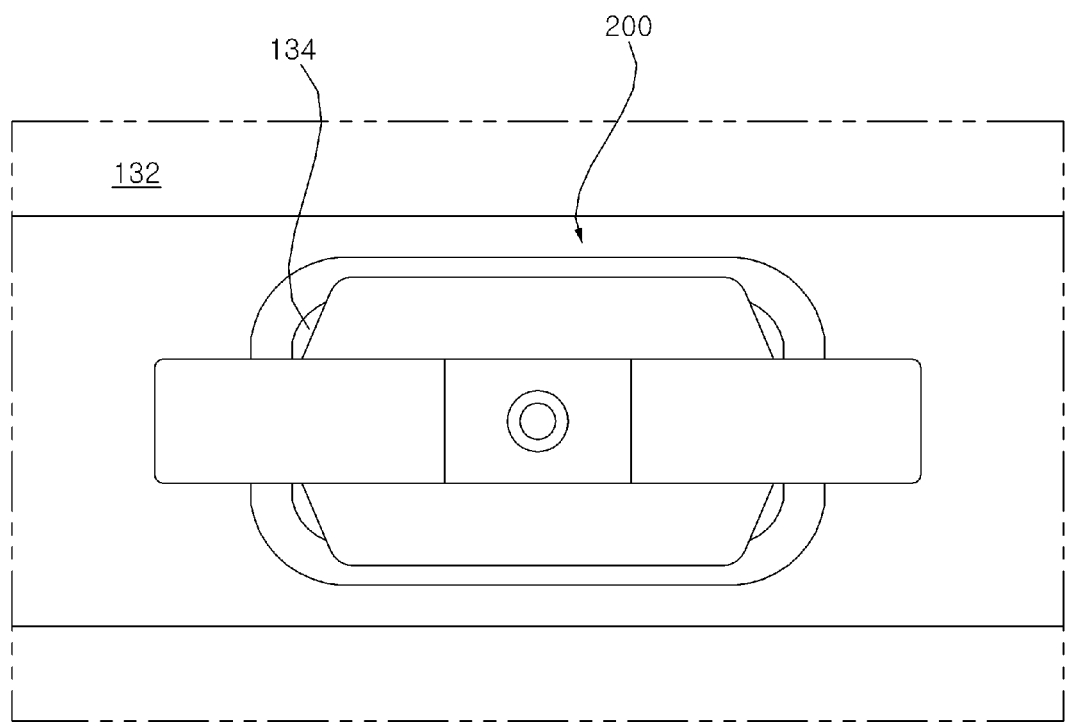
Figure 12:
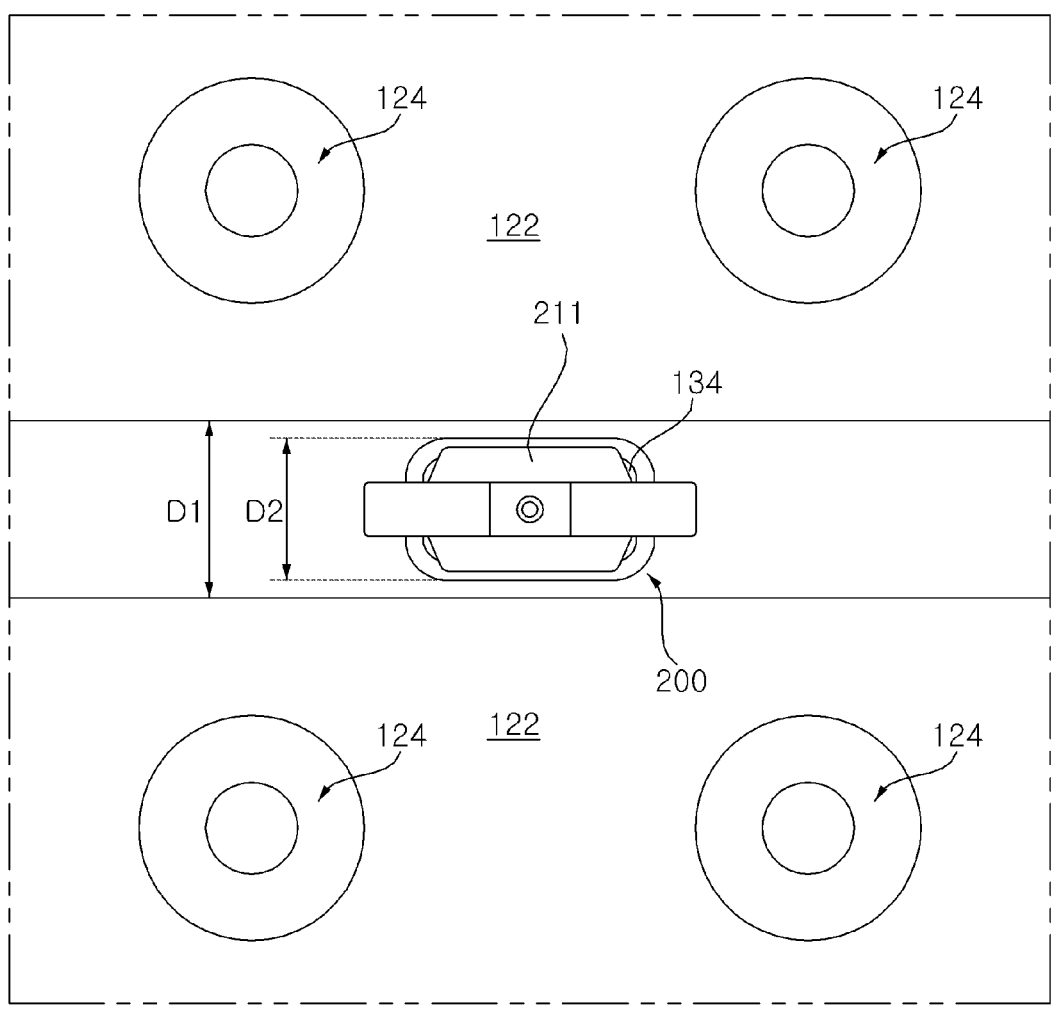

Referring to FIGS. 10 to 12, the support 200 may be mounted or coupled to the frame 130. The support 200 may be coupled to the rear surface of the fixing recess portion 134. The support 200 may be inserted into the frame 130 and rotated at the position of the fixing recess portion 134 so as to be coupled to the frame 130 (FIGS. 10 and 11).

The base 211 of the support 200 may generally have a rectangular shape. The base 211 may have a long side and a short side. The long side of the base 211 may be defined as a longitudinal direction, and the short side of the base 211 may be defined as a lateral direction. The width D2 of the base 211 or the width D2 of the fixing recess portion 134 may be less than the distance D1 between the substrates 122. The longitudinal direction of the base 211 may be parallel to the longitudinal direction of the substrates 122.

Consequently, it is possible to more densely dispose the substrates 122 and the light assembles 124 and to increase the amount of light that is provided to the display panel 110.

Figure 13:
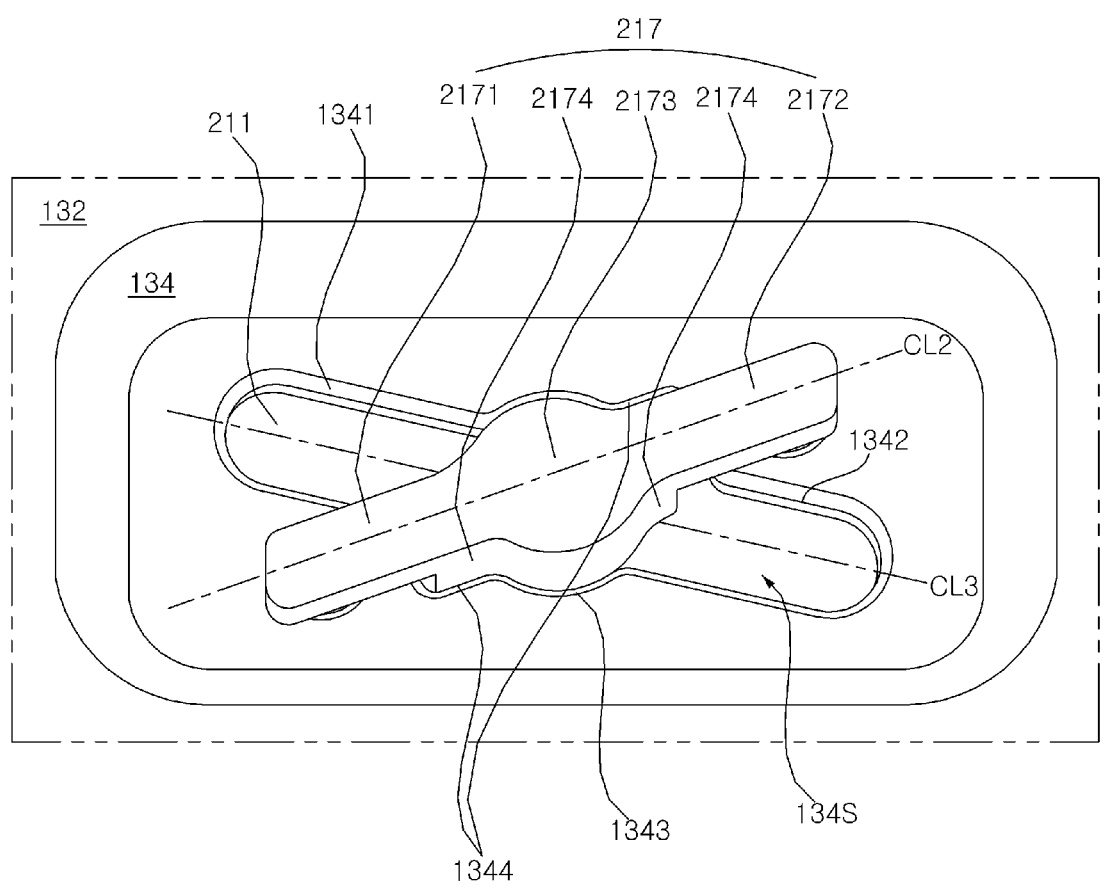
Figure 14:
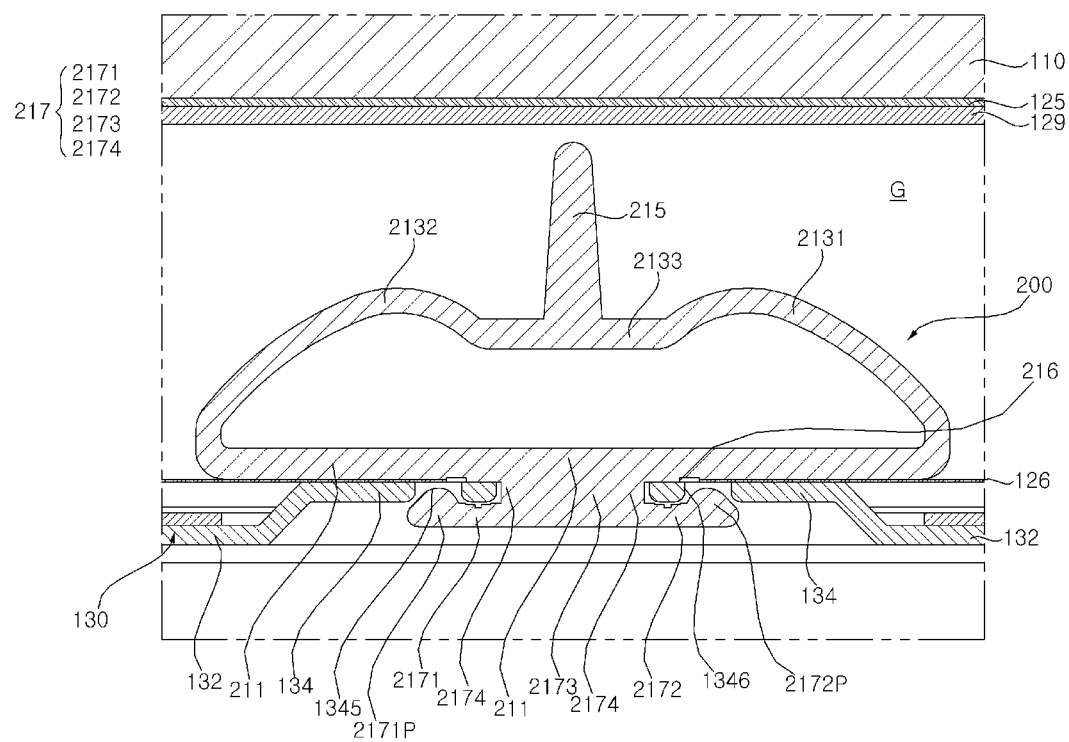

Referring to FIGS. 13 and 14, the shaft 2173 and the fixing bar 217 may be inserted into the fixing slot 134S, and the support 200 may be rotated to move the fixing bar 217 on the fixing slot 134S. The long axis CL2 of the fixing bar 217 may intersect the long axis CL3 of the fixing slot 134S. The reflection sheet 126 may be located in a space between the base 211 and the fixing recess portion 134 formed as the bottom 216 is supported by the outer surface of the fixing recess portion 134. The base 211 may push the reflection sheet 126, and the support 200 may fix the reflection sheet 126 to the frame 130.

For example, the angle between the long axis CL2 of the fixing bar 217 and the long axis CL3 of the fixing slot 134S may be about 35 degrees. Consequently, it is possible to improve convenience when mounting and/or replacing the support 200. If the angle between the long axis CL2 of the fixing bar 217 and the long axis CL3 of the fixing slot 134S is less than 35 degrees, efficiency in mounting the support 200 to the frame 130 may be reduced, and work errors may occur.

When the fixing bar 217 is rotated, the stopper 2174 may be caught by the stopper slot 1344. The stopper slot 1344 may receive the stopper 2174 of the support 200, and may contact the stopper 2174 to limit the range of rotation of the support 200.

When the fixing bar 217 is rotated, protrusions 2171P and 2172P formed on the fixing bar 217 may be inserted into the protrusion holes 1345 and 1346. The first protrusion 2171P formed on the first bar 2171 may be inserted into the first protrusion hole 1345, and the second protrusion 2172P formed on the second bar 2172 may be inserted into the second protrusion hole 1346. Consequently, the support 200 may be securely coupled to the frame 130.

When light is provided to the display panel 110, temperature applied to the diffusion plate 129 may increase, whereby the diffusion plate 129 may be deformed. For example, the diffusion plate 129 may droop. When the diffusion plate 129 droops, the support 200 may support the diffusion plate 129. The lower surface of the diffusion plate 129 may contact the tower 215 of the support 200. Consequently, the optical gap G may be maintained, whereby it is possible to prevent a reduction in image quality of the display device.

As is apparent from the above description, a display device according to the present disclosure has the following effects.

According to at least one of the embodiments of the present disclosure, it is possible to provide a display device configured such that light efficiency of a backlight unit is improved.

According to at least one of the embodiments of the present disclosure, it is possible to provide a display device having improved image quality.

According to at least one of the embodiments of the present disclosure, it is possible to provide a display device configured such that spatial efficiency of a backlight unit is improved.

According to at least one of the embodiments of the present disclosure, it is possible to provide a display device having improved productivity.

The additional scope of applicability of the present disclosure will be apparent from the above detailed description. However, those skilled in the art will appreciate that various modifications and alterations are possible, without departing from the idea and scope of the present disclosure, and therefore it should be understood that the detailed description and specific embodiments, such as the preferred embodiments of the present disclosure, are provided only for illustration.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a frame located at a rear of the display panel;
a light source located between the display panel and the frame, wherein the light source is configured to provide light to the display panel;
an optical layer located between the display panel and the light source, wherein the optical layer is configured to transmit the light provided by the light source; and
a support located between the frame and the optical layer, wherein the support is configured to support the optical layer, wherein the support comprises:
a base extending along the frame;
a tower connected to the base, wherein the tower extends toward the optical layer;
a shaft extending from a rear surface of the base toward the frame; and
a bar extending from the shaft in a direction intersecting a longitudinal direction of the base, wherein the bar is spaced apart from the base; and
wherein the frame comprises a flat portion facing the optical layer; and
a bar slot formed in the flat portion,
wherein the support is mounted on the frame when the bar of the support is inserted into the bar slot and is then rotated.

2. The display device according to claim 1, wherein the support further comprises a bridge connecting one end and the other end of the base, wherein the bridge is disposed between the base and the optical layer, and wherein the tower extends from the bridge.

3. The display device according to claim 1, wherein an intersection angle formed by the base and the bar is approximately 21 degrees.

4. The display device according to claim 1, wherein an intersection angle formed by the base and the bar slot is approximately 14 degrees.

5. The display device according to claim 1, wherein an intersection angle formed by the bar and the bar slot is approximately 35 degrees.

6. The display device according to claim 1, wherein the frame further comprises an inclined portion extending from the flat portion toward the display panel in a state of being inclined,
wherein the flat portion comprises a fixing recess portion recessed forward, and
wherein the bar slot is formed in the fixing recess portion.

7. The display device according to claim 6, wherein the support further comprises a bottom configured to form a step at the lower surface of the base together with the lower surface of the base, and the bottom is supported at the front surface of the flat portion by the fixing recess portion.

8. The display device according to claim 7, further comprising:
a reflection sheet located on the frame, wherein the reflection sheet is configured to reflect the light provided by the light source toward the display panel, wherein a portion of the reflection sheet is inserted into a gap formed between a front surface of the frame and the lower surface of the base by the bottom, and the base of the support pushes an upper surface of the reflection sheet.

9. The display device according to claim 1, wherein the frame further comprises a stopper slot formed in the flat portion, wherein the stopper slot extends in a direction intersecting a longitudinal direction of the bar slot,
    wherein an intersection angle formed by the stopper slot and the bar slot is approximately 35 degrees.

10. The display device according to claim 1, wherein the frame further comprises:
    a stopper slot formed in the flat portion, wherein the stopper slot extends in a direction intersecting a longitudinal direction of the bar slot;
    a protrusion hole formed so as to be spaced apart from one end of the stopper slot in a longitudinal direction of the stopper slot; and
    a second protrusion hole formed so as to be spaced apart from another end of the stopper slot in the longitudinal direction of the stopper slot, and
    the support further comprises:
    a first protrusion located adjacent to one end of the bar, the first protrusion protruding from the bar toward the base so as to be inserted into the first protrusion hole; and
    a second protrusion located adjacent to another end of the bar, the second protrusion protruding from the bar toward the base so as to be inserted into the second protrusion hole.

11. The display device according to claim 1, wherein the support further comprises a stopper formed at an outer circumferential surface of the shaft, the stopper is located between the base and the bar,
    wherein the frame further comprises a stopper slot formed in the flat portion, wherein the stopper slot extends in a direction intersecting a longitudinal direction of the bar slot,
    wherein a length of the stopper slot is smaller than a length of the bar slot,
    wherein the stopper is received in the stopper slot when the support is mounted on the frame.

12. The display device according to claim 11, wherein the frame further comprises a protrusion hole spaced apart from one end of the stopper slot in a longitudinal direction of the stopper slot,
    wherein the support further comprises a protrusion protruding from the bar toward the base, wherein the protrusion is inserted into the protrusion hole when the support is mounted on the frame.

13. The display device according to claim 11, further comprising:
    a first substrate extending long, wherein the first substrate disposed between the frame and the optical layer, wherein the light source is mounted on the first substrate; and
    a second substrate parallel to the first substrate, wherein the second substrate is disposed between the frame and the optical layer,
    wherein the support is located between the first substrate and the second substrate,
    wherein the bar slot elongates in a first direction intersecting with a longitudinal direction of the first substrate,
    wherein the stopper slot elongates in a second direction intersecting with the longitudinal direction of the first substrate, and
    wherein the second direction is tilted from the first direction in a rotational direction of the support.

14. The display device according to claim 13, wherein the first direction is tilted from the longitudinal direction of the first substrate in a rotational direction opposed to the rotational direction of the support.

15. The display device according to claim 14, wherein the second direction is tilted from the longitudinal direction of the first substrate in the rotational direction of the support.

16. The display device according to claim 13, wherein the longitudinal direction of the bar is positioned in the second direction when the support is mounted on the frame, and
    wherein the longitudinal direction of the base is parallel to the longitudinal direction of the first substrate.

* * * * *